INVENTOR.
HAROLD L. KIRK

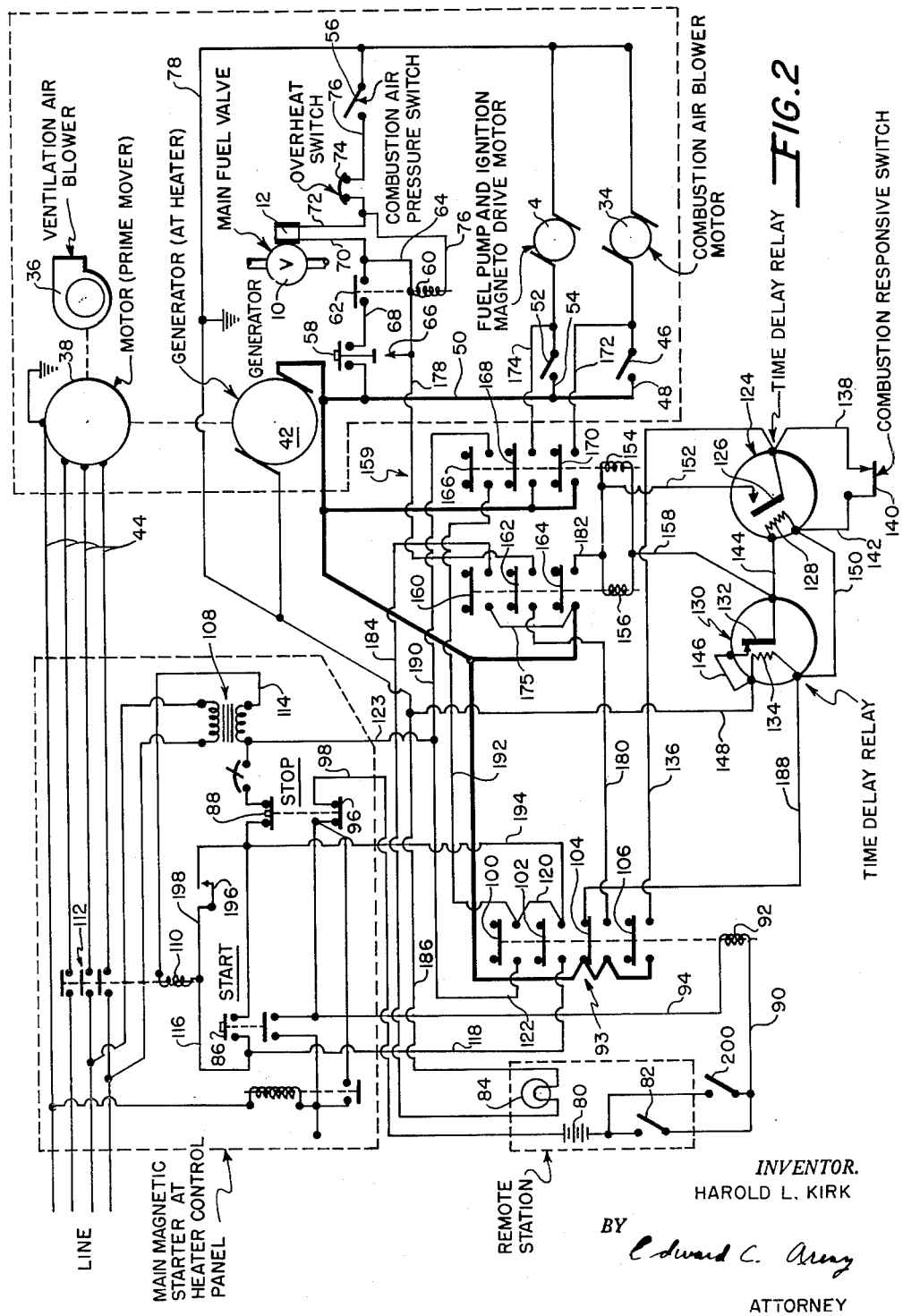

United States Patent Office 3,056,398
Patented Oct. 2, 1962

3,056,398
CONTROL SYSTEM FOR REMOTE OPERATION
OF AIR HEATER
Harold L. Kirk, Bettendorf, Iowa, assignor to American Air Filter Company, Inc., Louisville, Ky., a corporation of Delaware
Filed Sept. 19, 1960, Ser. No. 56,978
8 Claims. (Cl. 126—110)

This invention relates generally to a control system for a portable air heater and in particular to a control system adapted to permit on-off control of the heater from a remote location. Remote control with a minimum of apparatus at the remote station, but with a properly sequenced operation of the heater components, is desirable in connection with service of the heater in connection with missile launching pads.

An object of the invention is to provide a control system which: is adapted to provide a proper sequence of energizing and de-energizing various heater components by operation of an on-off switch at a remote location to obtain either a heating or a ventilating operation; may be applied to existing heaters having manually operated controls for proper sequencing; requires relatively few and inexpensive parts and may consequently be assembled into a compact package facilitating installation in kit form on exisitng heaters; and, provides automatic sequencing in a manner promoting safe air heater operation.

One type of heater to which the present invention is applicable includes an electric motor prime mover which, when energized from a main power source, drives a ventilating air blower and a generator. The generator, when up to speed, provides a source of electric power for: driving a combustion air blower and a fuel pump for supplying liquid fuel under pressure; energizing a fuel valve solenoid to permit pressurized fuel flow to a burner; and energizing such other electrical components of the heater as are necessary or desirable for proper heater operation.

Such a heater may conventionally have its various components energized and de-energized in a proper sequence by manually operating various separate electrical switches in a particular order so that the desired sequence of energization and de-energization in starting and stopping is effected. The invention contemplates that certain of the manually operated switches be bypassed and the energization of various heater elements in the proper sequence be effected in accordance with selective actuation of relays, time delay devices and switches responsive to conditions of heater operation.

The invention will be described in connection with the accompanying drawing illustrating one embodiment incorporating the principles of the invention by way of example, and wherein:

FIGURE 2 is a schematic view of a control system of the invention as applied to control components of a heater of the type shown in FIGURE 1.

Figure 1:
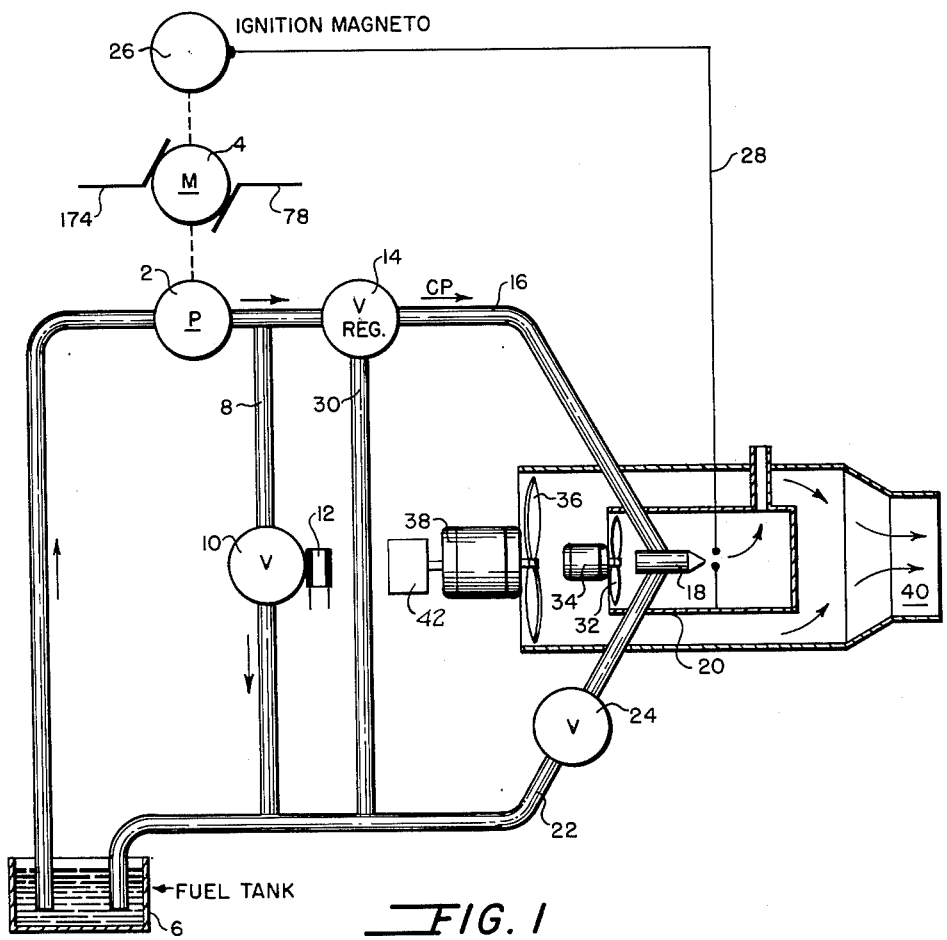
FIGURE 1 is a somewhat diagrammatic view of parts of an air heater having a fuel system of the bypass type.

Referring to FIGURE 1, the fuel system of the heater to be considered is of the bypass type wherein a fuel pump 2 driven by motor 4 pumps fuel taken from tank 6 into a primary bypass line 8 so long as the primary bypass valve 10 controlled by solenoid 12 is open. When valve 10 is closed by energization of the solenoid, fuel passes at a predetermined pressure controlled by regulating valve 14 through nozzle supply line 16 to the nozzle 18 where part of it is normally discharged into the burner 20 and the remainder of the fuel passes back to the tank 6 through the return line 22 containing a temperature selector valve 24 adapted to be set to give a predetermined desired ventilation air temperature.

An ignition magneto 26, also driven by motor 4, is connected by conductor 28 to provide a fuel igniting spark in the burner. A secondary fuel bypass line 30 connects the regulating valve 14 to the return line 22 to return any fuel in excess of that required for providing the predetermined fuel pressure in the supply line 16 to the nozzle.

A combustion air blower 32 driven by motor 34 provides combustion air, and a ventilation air blower 36 driven by motor 38 passes air in indirect heat exchange relation around the burner and combustion chamber to an outlet 40 connected by suitable duct work to convey the ventilation air to the space to be served by the heater.

The FIGURE 1 apparatus is generally conventional and has been described to provide background for the following description.

In starting a heater such as shown in FIGURE 1, the sequence in which various components are energized is normally as follows. First, the ventilation air blower is operated for a period to provide ventilation air purging. Then the combustion air blower motor is energized for a period so that the burner and combustion chamber are purged of any collected vapors before additional fuel is discharged into the burner. The fuel pump-ignition magneto motor may be either simultaneously or subsequently energized so that fuel is being pumped around the fuel system and an igniting spark is available in the burner as soon as fuel is permitted to be discharged thereinto. The primary bypass valve solenoid is then energized so that fuel flow to the nozzle is initiated and combustion in the burner will be started.

The FIGURE 2 view includes broken line outlines intended to segregate the elements of the figure by nature and general physical location. The broken line box of the right of FIGURE 2 encloses conventional parts of the air heater proper; the main magnetic starter elements within the so-identified broken line box are also generally conventional and are located with the control switches on the air heater control panel; the remote station indicated within the broken line outline is located at whatever distance from the air heater is deemed desirable in accordance with operational conditions; and the remaining unenclosed elements constitute the elements of what will herein be termed a "kit" and which is fixed to the heater structure and electrically connected as illustrated to achieve the remote control desired.

To facilitate understanding of the functions of the elements comprising the kit and remote control station, manual starting of the heater without using such elements will first be described. The prime mover motor 38 (FIGURE 2) for operating the ventilating air blower 36 and a generator 42 is first energized by closing the switch in the main power line 44 by operation of the main magnetic starter. When the generator is up to speed, switch 46 in the line 48 between the generator output line 50 and the combustion air blower motor 34 is manually closed to energize that motor and provide the combustion air. The switch 52 in the line 54 to the fuel pump-ignition magneto motor 4 is then closed so that the fuel will circulate in the fuel system, and an ignition spark will be available in the burner. The combustion air pressure switch 56 in series with the solenoid 12 associated with the primary bypass valve 10 is closed by a predetermined combustion air pressure, and the burner is then ready to be fired by closing push-button switch 58 and then further pressing it momentarily to an extreme depressed position to engage auxiliary contact 66 and thus energize winding 60 which closes reset relay switch 62. The winding 60 remains energized, after the push-button switch 58 is released from its momentary extreme position, through line 64 and holds the reset relay switch 62 in a closed position. Thus, a circuit for maintaining the solenoid 12 energized under normal running conditions includes the generator output line 50, push-button switch 58, line 68, closed reset relay switch 62, line 70, solenoid 12, line 72, normally closed overheat switch 74, line 76, combustion air pressure switch 56, and ground line 78 of the generator. If it is desired to terminate combustion, push-button switch 58 is opened to break the circuit to the solenoid 12. This circuit is also broken if either the overheat switch 74 opens (in response to a ventilating air temperature in excess of say 230°) or the combustion air pressure switch 56 opens due to failure of combustion air.

Having described generally how the air heater would be manually started, attention will now be given to the arrangement for remote automatic control. The remote station includes a suitable battery 80, such as a 28 volt direct current battery, an on-off switch 82 in series therewith, and an indicator lamp 84. In practicing the invention, the on-off switch 82 is closed to initiate a predetermined sequence of heater starting steps. The lamp 84 indicates, according to whether or not it is lit, the operating condition of the air heater. When the switch 82 is opened, the heater will shut down in a series of steps of predetermined sequence.

The main magnetic starter includes a normally open, momentary contact, double pole start switch 86 and a separate normally closed, double pole stop switch 88, both being located, along with other elements of the main magnetic starter, at the air heater proper. These two switches remain in the positions shown in FIGURE 2 throughout any operating sequence initiated at the remote station. However, the normally closed stop switch 88, and certain other elements of the magnetic starter, are connected in a manner permitting their use to complete certain circuits as will hereinafter appear.

The remaining elements of FIGURE 2, i.e., those not enclosed within the broken line boxes, comprise what is called the remote control kit, and include a pair of time delay relays, several other relays having multiple switches, a combustion responsive switch, and certain electrical connections. Details of these elements and the connections will be noted as the description progresses.

When it is desired to begin heater operation, the switch 82 at the remote station is closed. This completes the remote control circuit, starting with one side of battery 80, switch 82, line 90, winding 92 of the relay 93, which will be herein termed the first relay for identification purposes, line 94 to lower pole switch arm 96 of stop switch 88 in the magnetic starter, and line 98 back to the opposite side of the battery 80. With winding 92 energized, the first relay switch blades 100, 102, 104, 106 are moved from their illustrated positions engaging the upper contacts, to their opposite or actuated positions engaging the lower contacts.

The switch 102 in its lower contact position completes a secondary circuit of the transformer 108 for energizing the winding 110 controlling the main power switch 112 in the main power line 44. The primary of the transformer 108 is connected to a pair of leads on the power side of the main power switch 112. The secondary circuit completed through closure of switch 102 may be traced from the transformer secondary through line 114 to winding 110, line 116 to one side of start switch 86, line 118, switch 102 in its actuated position, line 120, switch 100 in its actuated position, and lines 122 and 123 to the opposite side of the transformer secondary.

When the main power line switch 112 closes in response to energization of winding 110, the electric motor prime mover 38 of the air heater is energized. Thus, ventilation air flow is established by blower 36, and the generator 42 (which may be, for example, a 28 volt direct current generator) reaches normal operating speed. Power is then available from the generator through the power line 50 shown in FIGURE 2 as a heavy line.

Attention will now be given to the two time delay relays of the kit which come into operation during a normal starting sequence after generator power is available and the first relay switches 100—106 are in their actuated position. The time delay relay 124 on the right of FIGURE 2, includes a normally open bi-metal warp switch 126 and a resistance heater or actuator 128 associated therewith for closing the switch after energization of the heater for about 30 seconds. The left time delay relay 130 includes a normally closed bi-metal warp switch 132 and an associated resistance heater or actuator 134 adapted to open the switch after about 2 minutes of energization of the heater. Both time delay relays may conveniently be of the conventional plug-in type enclosed within a cylindrical envelope and having terminals in the form of a pronged base.

When the first relay switches 100—106 are actuated to their second position by energization of winding 92, and power from the generator output line 50 subsequently becomes available, a circuit for energizing the resistance heaters 128 and 134 of the two time delay relays is completed. This circuit may be traced from generator output line 50, through first relay switch 106 in its second or lower contact position, line 136 to one side of switch 126 (at this time open) of the right time delay relay, line 138 to a normally closed combustion responsive switch 140, line 142 to one side of heater 128 of the right time delay relay, and then by way of parallel paths back to the ground side 78 of the generator; one of the parallel paths including heater 128, line 144 to the one side of the switch 132 of the left time delay relay, switch 132, line 146, and line 148 connected to the ground side of the generator; and the other of the parallel paths including line 150 from the first side of heater 128 to one side of left time delay relay heater 134, heater 134 and the line 148. Thus, it will be apparent that the circuit for initially energizing the time delay relay heaters includes the left time delay relay heater 134 in parallel with the left time delay relay switch 132.

After about 30 seconds of energization of the right time delay relay heater 128, its associated switch 126 is actuated to a closed position. When this occurs, the pair of relays shown in FIGURE 2 generally above the time delay relays, and which will herein be collectively termed the second relay 159 since they are actuated simultaneously, will have their actuating windings energized through closure of this time delay relay switch 126. The circuit for initially energizing these windings may be traced from generator power line 50 through actuated switch 106, line 136, switch 126, line 152 to the relay windings 154 and 156 in parallel, back to the left time delay relay switch 132 through line 158 and then to the ground side of the generator through lines 146 and 148.

When the second relay is actuated by energized windings 154 and 156, the controlled switches move from their upper contact position (the position shown in FIGURE 2) to their lower contact or actuated positions. The switch blades of the second relay are designated 160, 162, and 164 for the left unit and 166, 168, 170 for the right unit. With actuation of these second relay switches, the combustion air blower motor 34 is energized from the generator output line 50 through switch 170 in its actuated position and connecting line 172, and the fuel pump-ignition magneto motor 4 is energized through switch 168 in its actuated position and its connecting line 174.

When the combustion air pressure reaches a value which causes the combustion air pressure switch 56 to close, the solenoid 12 will be energized and primary bypass valve 10 controlled thereby will operate to a closed position so that fuel flows to the burner as described previously in connection with FIGURE 1. The completed circuit including the primary bypass valve solenoid 12 can be traced, starting with the ground side line 78 of the generator, through combustion air pressure switch 56 line 76, overheat switch 74, line 72, solenoid 12, line 70, line 64, line 178 (which has connected thereto the auxiliary contact 66 of the control panel push-button switch), switch 162 in its actuated position, line 180, and switch 104 in its actuated position connected to generator output line 50.

After a period of about 30 seconds of combustion in the burner, the combustion responsive switch 140 connected between terminals of the right time delay relay 124 opens in response to detection of combustion. This opens the previously traced circuit for initially energizing the two time delay relay heaters 128 and 134. Thus, time delay switch 126 will open when it cools, and time delay switch 132 will remain closed (since less than two minutes have elapsed since resistance heater 134 was initially energized).

When the time delay relay switch 126 opens, this opens the circuit which had originally been completed by this switch for energizing the pair of second relay windings 154 and 156. However, when these windings were first energized and their associated relay switches actuated, a holding circuit for these windings was established from the generator output line 50, through switch 164 of the second relay in its lower position, line 182, windings 154 and 156 in parallel, line 158, time delay relay switch 132, and lines 146 and 148 to the ground side of the generator. Consequently the relays containing these switches 160—170 remain in their actuated position when the switch 126 opens. It is here noted also, that when the second relay 159 is initially actuated, the indicator lamp 84 at the remote control station is lighted directly from the generator output through a completed circuit which may be traced from the generator output line 50, one contact of switch 164, jumper line 175, actuated switch 160 of the second relay, line 184 to the lamp 84, and line 186 connected to the ground side 78 of the generator. This lighted lamp 84 indicates, in the air heater starting sequence, that the second relay 159 for effecting energization of the combustion air blower motor 34 and fuel pump-ignition magneto motor 4 is actuated.

If it is now assumed that the heater properly operates, the electrical connections for the various circuits described thus far will be maintained. In starting, it will be apparent that some ventilation air purging occurs while the generator reaches operating speed; that an additional 30 seconds purging occurs before the time delay switch 126 closes in response to heat emitted by its energized heater 128; and that the primary bypass valve 10 cannot be operated to a closed position causing fuel flow to the burner until the combustion air blower creates sufficient air pressure to close the switch 56.

In stopping heater operation from the remote location, certain purging steps also take place during shut-down. To stop the air heater, switch 82 is opened to break the circuit including winding 92 for first relay 93. Switches 100—106 will consequently operate to their upper or non-actuated positions to which they are biased by conventional means. When this occurs, the circuit for energizing the solenoid 12 controlling the primary bypass fuel valve 10 is opened through operation of switch 104 to its upper position. Consequently, combustion in the burner is terminated since the fuel recirculates back to the tank through the primary bypass line as described in connection with FIGURE 1.

When the first relay switches 100—106 engage their upper contacts, the time delay relay heaters 128 and 134 again become energized from the generator output line 50 through switch 104 in its upper position, line 188, and heater 134 connected to line 148; and a parallel path from line 188 including line 150, heater 128, line 144, time delay switch 132 and line 146, also connected to the line 148 and the ground side line 78 of the generator.

After the heater 134 of the left time delay relay has been energized for two minutes, associated switch 132 opens and thereby breaks the holding circuit for the relay windings 154 and 156. Thus, during shut-down, about two minutes of combustion and ventilation air flow purging is obtained without burner fire. While combustion responsive switch 140 will close upon sensing failure of combustion in the burner, and time delay relay switch 126 will close in response to the 30 seconds of energization of its associated heater 128, both of these actions occurring during this two minute period of ventilation air and combustion air purging, neither of these occurrences are of any operating consequence at this time since opening of the time delay relay switch 132 after the two minute period opens the direct return connection to the ground side of the generator.

With de-energization of the windings 154 and 156, the associated switches 160—170 of the second relay operate to their upper contact position to which they are biased by conventional means. Thus, the combustion air blower motor 34 is de-energized by switch 170 operating to its upper position and fuel pump-ignition magneto motor 4 is de-energized by operation of switch 168 to its upper position.

During the two minute period following de-energization of relay winding 92 by opening of remote control on-off switch 82, the electric motor prime mover 38 and its driven elements namely, blower 36 and generator 42, continue to operate by virtue of an alternate circuit having been established for holding winding 110 of the main magnetic starter energized and consequently maintaining the main power line switch 112 in a closed position. This alternate holding circuit may be traced, starting downwardly from the transformer 108 secondary, through line 123, line 190, switch 166 of second relay 159 in its actuated position (the winding 154 and 156 not being de-energized until the expiration of the two minute period), line 192 to one lower contact of switch 100 of first relay 93, line 120 bridging to a lower contact of switch 102, line 194 up to closed auxiliary contact switch 196 of the main magnetic starter (this normally open switch 196 operatiing to a closed position when the main power switch of the magnetic starter is closed to permit releasing the push-button start switch, all as is conventional in such a magnetic starter), line 198, winding 110, and line 114 back to the opposite side of the transformer secondary. Of course when at the end of the two minute period, the second relay switch 166 operates to its upper contact position, this alternate holding circuit for the magnetic starter coil 110 is opened and main power switch 112 opens the power line to the electric prime mover 38, so that the fuel pump-ignition magneto motor 4, the combustion air blower motor 34, and prime mover 38 will simultaneously be shut down when the left time delay relay switch 132 opens at the end of the two minute purging period.

From the foregoing it will be appreciated that with the described arrangement a proper sequence of steps for both air heater starting or stopping may be effected through simply closing or opening the remote station switch 82. Now the possibility of some malfunction of the air heater will be considered in connection with the resulting operation occasioned by such a malfunction.

Assume that the air heater is being started in the previously described manner, and that for some reason the fuel does not ignite when discharged into the burner. The combustion responsive switch 140 will then remain closed so that the circuit energizing the time delay relay heaters 128 and 134 will remain completed. Thus, two minutes after resistance heater 134 is initially energized from the generator output through switch 106 of first relay 93 in its lower position and successive lines and elements previously traced, the left time delay relay switch 132 opens and de-energizes windings 154 and 156. This de-energizes the primary bypass valve solenoid 12 stopping fuel flow to the burner, stops the combustion air blower motor 34, stops the fuel pump-ignition magneto motor 4 and extinguishes lamp 84; all through operation of switches 160—170 to their upper positions. Ventilation air purging continues however since relay winding 92 remains energized and the prime mover 38 continues to operate. However, unless remote control on-off switch 82 is then opened, the air heater cannot be restarted for heating since the time delay relay heater 134 remains energized and so causes its switch 132 to remain open.

The invention also permits operation of the air heater as a ventilation air blower only from the remote station by operation of remote switch 82 in a sequence determined by illumination of lamp 84. If it is desired to operate the heater as a ventilator only, the sequence of steps for starting a normal heating operation is followed until lamp 84 is first lit. This indicates second relay 159 is actuated and that combustion is ready to begin. The remote switch 82 is then opened to de-energize first relay winding 92 and first relay switches 100—106 operate to their non-actuated positions. Thus switch 104 breaks the circuit to the solenoid 12 so that fuel bypasses the burner. The second relay 159 remains energized, and of course the prime mover motor 38 also remains energized as detailed before. However, after about 90 seconds, the left time delay switch will be opened by its resistance heater 134 which receives current from the generator output line 50, switch 104 in its non-actuated position and line 188. When switch 132 opens, the second relay 159 switches 160—170 operate to their open positions and de-energize the fuel pump-ignition magneto motor 4, the combustion air blower 34, the prime mover 38 (through opening of switch 166 and consequent de-energization of line switch 112 controlled by winding 110), and the lamp 84 through opening of switch 160. However, when it is observed that lamp 84 goes out, remote switch 82 is closed, the winding 110 is again energized, and the prime mover motor 84 resumes operation furnishing ventilation air. Closing of switch 82 also actuates the first relay 93 so that a circuit to maintain time delay switch 132 open through continued energization of its heater 134 is completed, from generator output line 50, through actuated switch 106, line 136, line 138, closed combustion responsive switch 140, line 142, line 150, heater 134 and line 148 to ground. Thus so long as switch 132 remains open under these circumstances, second relay switches 160—170 cannot be closed, and a ventilation operation only is obtained.

It will also be appreciated that if solenoid 12 controlling the primary bypass valve 10 is de-energized by either a combustion air pressure failure permitting switch 56 to open, or an overheat condition causing overheat switch 74 to open, the valve 10 will open and stop fuel flow to the burner, and the combustion responsive switch 140 will close, thereby beginning the same shut-down sequence detailed heretofore.

When it is desired to initiate operation of the air heater at its location without use of the remote control on-off switch 82, a switch 200 in parallel with switch 82 may be closed.

Certain elements conventionally included with the main magnetic starter are shown on the drawing, but their operation in connection with the present invention is not deemed necessary. Further, certain elements such as panel lights, branch circuit breakers, interlocks, etc., such as are commonly used in air heater electrical control circuits have been deleted to make the description more readily understandable.

The invention claimed is:

1. In a heating system including: a remotely located air heater provided with an electric motor prime mover driving a ventilating air blower and an electric power generator, and having a combustion air blower and burner fuel supply means adapted to be powered by said generator output; a main power source; a main power line connecting said electric motor prime mover to said source; first relay means including a winding, and a plurality of controlled switches having a first non-actuated position and an opposite actuated position; circuit means including a remote control station controlling operation of said heater including an independent power source and on-off switch means in series therewith operable, in a closed position, to energize said first relay winding; circuit means including main power line switch means operable to a closed position energizing said electric motor prime mover in response to actuation of said first relay means; a first normally closed time delay switch operable to an open position in a first predetermined period after energization of its actuator; a second normally open time delay switch operable to a closed position in a second predetermined period of lesser duration than said first period after energization of its actuator; initial energizing circuit means simultaneously energizing said first and second time delay actuators from said generator output through one of said first relay switches in an actuated position; second relay means including winding means and a plurality of controlled switches; second relay winding energizing circuit means initially actuating said second relay means upon closure of said second time delay switch, said last recited circuit being connected to said generator output through an actuated first relay switch and including said first and second time delay switches in series; circuit means connecting said combustion air blower and fuel supply means and energized from said generator output through actuated switch means of said second relay means; circuit means energizing, from said generator output, a fuel valve solenoid to permit fuel flow to said burner, said fuel valve solenoid energizing circuit means including an actuated switch of said second relay means and a normally open combustion air pressure switch operable to a closed position in response to a predetermined combustion air pressure; normally closed switch means in said initial energizing circuit means for said time delay actuators operable to an open position in response to predetermined combustion conditions in a normal heater starting sequence to open said circuit for deenergizing said actuators before said first time delay switch is actuated; and holding circuit means maintaining said second relay winding means energized from said generator output after said second time delay switch means opens, said circuit including an actuated switch of said second relay means and said first time delay switch in series.

2. The system of claim 1 including transformer means having a primary circuit connected to said main power line on the power side of said main power line switch means and a secondary circuit having a third relay winding operable, when energized, to actuate said main power line switch means, said secondary circuit including a pair of said first relay switches in their actuated position; and an alternate secondary circuit for maintaining said third relay winding energized after initial energization through said first secondary circuit, said alternate circuit including an actuated switch of said second relay means.

3. The system of claim 1 wherein said circuit for energizing said fuel valve solenoid includes an actuated switch of said first relay.

4. The system of claim 1 wherein said remote control station includes means for indicating the operational condition of said heater; and circuit means for energizing said indicating means from said generator output including an actuated switch of said second relay means.

5. The system of claim 2 including alternate circuit means for energizing said first time delay relay actuator from said generator output through one of said first relay means switches in a first non-actuated position so that, responsive to opening of said remote control switch de-energizing said first relay means winding and said first predetermined period, said first time delay switch opens said second relay means holding circuit.

6. In a heating system including: a remotely located air heater having a burner, a fuel supply means for said burner, an electrically controlled fuel valve, a combustion air blower, and an electric motor driving a ventilating air blower and a generator; a first relay having a plurality of switches, a second relay having a plurality of switches; a first thermal relay having a normally closed switch opening after a first period of energization; a second thermal relay having a normally open switch closing after a shorter second period of energization; circuit means connecting said generator to said first and second relay switches; circuit means including switch means of said second relay energizing said combustion air blower and said fuel supply means when said second relay is actuated; circuit means including combustion air responsive switch means energizing said fuel valve to permit fuel flow to said burner; circuit means connecting said first and second thermal relays to said switch means of said first relay to actuate said second relay upon closure of said second thermal relay switch after said second period; circuit means including a remote station switch energizing said electric motor and actuating said first relay concurrently when said remote station switch is closed; and normally closed switch means opening said circuit means to said first thermal relay in response to normal combustion for a period of duration between said first and second periods.

7. The system of claim 6 wherein: said circuit means energizing said fuel valve includes an actuated switch of said first relay and an actuated switch of said second relay in series whereby both said first and said second relay must be energized to permit fuel flow to said burner.

8. The system of claim 6 including: second relay holding means including an actuated switch of said second relay and said normally closed switch of said first thermal relay in series.

References Cited in the file of this patent
UNITED STATES PATENTS

| | | |
|---|---|---|
| 2,490,095 | Rosche | Dec. 6, 1949 |
| 2,839,129 | St. Clair | June 17, 1958 |
| 2,964,102 | Cassell et al. | Dec. 13, 1960 |